(12) United States Patent
Kim et al.

(10) Patent No.: US 9,924,422 B2
(45) Date of Patent: Mar. 20, 2018

(54) METHOD AND USER EQUIPMENT FOR PERFORMING MEASUREMENT ON CELL

(71) Applicant: LG Electronics Inc., Seoul (KR)

(72) Inventors: Sangwon Kim, Seoul (KR); Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/409,073

(22) PCT Filed: Jul. 8, 2013

(86) PCT No.: PCT/KR2013/006033
§ 371 (c)(1),
(2) Date: Dec. 18, 2014

(87) PCT Pub. No.: WO2014/010892
PCT Pub. Date: Jan. 16, 2014

(65) Prior Publication Data
US 2015/0195758 A1    Jul. 9, 2015

Related U.S. Application Data

(60) Provisional application No. 61/670,138, filed on Jul. 11, 2012.

(51) Int. Cl.
*H04W 4/00* (2009.01)
*H04W 36/00* (2009.01)
(Continued)

(52) U.S. Cl.
CPC ....... *H04W 36/0088* (2013.01); *H04W 24/10* (2013.01); *H04W 36/30* (2013.01); *H04W 84/045* (2013.01)

(58) Field of Classification Search
None
See application file for complete search history.

(56) References Cited

U.S. PATENT DOCUMENTS

2007/0129017 A1* 6/2007 Dalsgaard ............. H04W 52/44
455/67.11
2008/0220784 A1* 9/2008 Somasundaram ........................
H04W 36/0083
455/437

(Continued)

FOREIGN PATENT DOCUMENTS

| KR | 10-2009-0055942 A | 6/2009 |
| KR | 10-2009-0129448 A | 12/2009 |
| KR | 10-2011-0036692 A | 4/2011 |

OTHER PUBLICATIONS

U.S. Appl. No. 61/612,865.*

(Continued)

*Primary Examiner* — Kwang B Yao
*Assistant Examiner* — Juvena Loo
(74) *Attorney, Agent, or Firm* — Morgan, Lewis & Bockius LLP

(57) ABSTRACT

According to an embodiment of the present specification, a method of performing a measurement on one or more of a serving cell and a neighboring cell is provided. The method may include: measuring signal quality for a neighboring node; scaling-down or scaling-up parameter values that trigger the transmission of a measurement report according to measurement results; and transmitting the measurement report.

12 Claims, 15 Drawing Sheets

(51) Int. Cl.
  *H04W 24/10* (2009.01)
  *H04W 84/04* (2009.01)
  *H04W 36/30* (2009.01)

(56) References Cited

U.S. PATENT DOCUMENTS

| | | | |
|---|---|---|---|
| 2009/0059871 A1* | 3/2009 | Nader | H04W 36/0083 370/337 |
| 2009/0238098 A1* | 9/2009 | Cai | H04W 76/048 370/254 |
| 2010/0216474 A1* | 8/2010 | Park | H04W 24/10 455/436 |
| 2010/0234014 A1* | 9/2010 | Virkki | H04W 36/0088 455/423 |
| 2011/0026492 A1* | 2/2011 | Frenger | H04W 36/0083 370/331 |
| 2011/0028144 A1* | 2/2011 | Catovic | H04L 5/003 455/423 |
| 2011/0081903 A1 | 4/2011 | Cai et al. | |
| 2011/0117954 A1* | 5/2011 | Iwamura | H04W 36/0094 455/525 |
| 2011/0211560 A1 | 9/2011 | Yamamoto et al. | |
| 2012/0129536 A1 | 5/2012 | Zou et al. | |
| 2012/0202482 A1* | 8/2012 | Katepalli | H04W 36/0083 455/423 |
| 2013/0084849 A1* | 4/2013 | Koskinen | H04W 36/0088 455/422.1 |
| 2013/0210435 A1* | 8/2013 | Dimou | H04W 36/0083 455/436 |
| 2013/0244664 A1* | 9/2013 | Song | H04W 36/0083 455/437 |
| 2013/0295951 A1* | 11/2013 | Mach | H04W 36/32 455/456.1 |
| 2014/0045500 A1* | 2/2014 | Dimou | H04W 36/0083 455/436 |
| 2014/0213254 A1* | 7/2014 | Yang | H04W 36/24 455/436 |
| 2014/0349656 A1* | 11/2014 | Sfar | H04W 36/0088 455/437 |
| 2015/0038151 A1* | 2/2015 | Dalsgaard | H04W 36/0083 455/444 |
| 2015/0119039 A1* | 4/2015 | Virtej | H04W 24/10 455/436 |

OTHER PUBLICATIONS

International Search Report issued in corresponding International Patent Application No. PCT/KR2013/006033 dated Jul. 8, 2013.

* cited by examiner

METHOD AND USER EQUIPMENT FOR PERFORMING MEASUREMENT ON CELL

BACKGROUND OF THE INVENTION

Field of the Invention

The present invention relates to a method and a user equipment performing measurement on a serving cell and one or more neighboring cells.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Micro cells, femto cells, and pico cells which provide small service regions are installed at particular locations within a macro cell which supports large coverage.

A user equipment, a typical example of mobile devices, moves easily, and service quality of a current cell may be degraded or a new cell providing a better service than the current one can be found from the movement. Therefore, the user equipment may move to the new cell found, which is called a user equipment's performing mobility.

Each cell supports fixed coverage and a user equipment can move at a variable speed within the scope of a wireless communication system. Therefore, frequency of the user equipment's performing mobility can vary depending on situations. To support mobility of a user equipment by taking into account the mobility state of the user equipment, a method for mobility state estimation (MSE) and a method for scaling mobile parameters have been used. By using the method, a user equipment can determine whether to report a measurement result, and mobility of the user equipment can be carried out on the basis of a measurement report. Therefore, the MSE and scaling of mobile parameters are closely related to carrying out mobility of a user equipment.

Meanwhile, a particular type of a wireless communication environment is in service, which comprises macro cells and small cells. Such a wireless communication environment can be called a heterogeneous network. In a heterogeneous network, a few of small cells can be defined within the coverage of a macro cell.

In an environment such as the above, if a user equipment moves around on the basis of a measurement report through the existing MSE and mobility parameter scaling, a problem such as a radio link failure (RLF) or a handover failure may occur. In this sense, there needs a measurement report method which can be carried out adaptively according to a mobility state of a user equipment and the type of a target cell in a communication environment where macro cells and small cells are coexistent.

SUMMARY OF THE INVENTION

An object of the present invention is to provide an efficient measurement report method which takes into account mobility of a user equipment.

To achieve the object, according to tone embodiment of the present specification, there is provided a method for performing a measurement with respect to a neighbor node. The method may comprise: performing measurement of a signaling quality with respect to a neighbor node; scaling down or up a value of a parameter to trigger a transmission of a measurement report, according to a result of the measurement; and transmitting the measurement report.

The method may further comprise: checking the result of the measurement.

The checking step may include: checking a difference between plural signaling qualities; and comparing the difference with a threshold.

In checking the difference, a variation between successive signaling qualities may be checked during a given time-period or during the given number of the measurements.

In checking the difference, it may be checked for a direction of a variation between successive signaling qualities which are measured during a given time-period or during the given number of the measurements.

If the result of the measurement during a given time-period or during the given number of the measurements increases thereby being greater than or equal to a threshold, the value of the parameter may be scaled down.

If the result of the measurement during a given time-period or during the given number of the measurements decreases thereby being smaller than or equal to a threshold, the value of the parameter may be scaled up.

The parameter may include at least one of: the time to trigger the transmission of the measurement report; an A3-offset to be used in the measurement report triggering condition for event A3; and a cell reselection timer.

In scaling down or up the value of the parameter, the value of the parameter may be multiplied with a scaling factor.

The scaling factor may include at least one of: a first scaling factor for the time to trigger the transmission of the measurement report; a second scaling factor for an A3-offset to be used in the measurement report triggering condition for event A3; and a third scaling factor for a cell reselection timer.

The method may further comprise: receiving at least one of the value of the parameter and information on the scaling factor.

To achieve the objection, according to the one embodiment of the present specification, there is provided a terminal for performing a measurement with respect to at least one of a serving cell and a neighbor cell. The terminal may comprise: a radio frequency (RF) unit; and a processor configured to perform through the RF unit a measurement on a signaling quality with respect to a neighbor node, scale down or up a value of a parameter to trigger a transmission of a measurement report, according to a result of the measurement; and transmit the measurement report.

According to the present invention, a user equipment adjusts reporting of a measurement result and re-selection timing according to signal strength of a handover target cell or a re-selection target cell, thereby improving a success rate of the handover and cell re-selection in a heterogeneous network.

DESCRIPTION OF EXEMPLARY EMBODIMENTS

Figure 1:
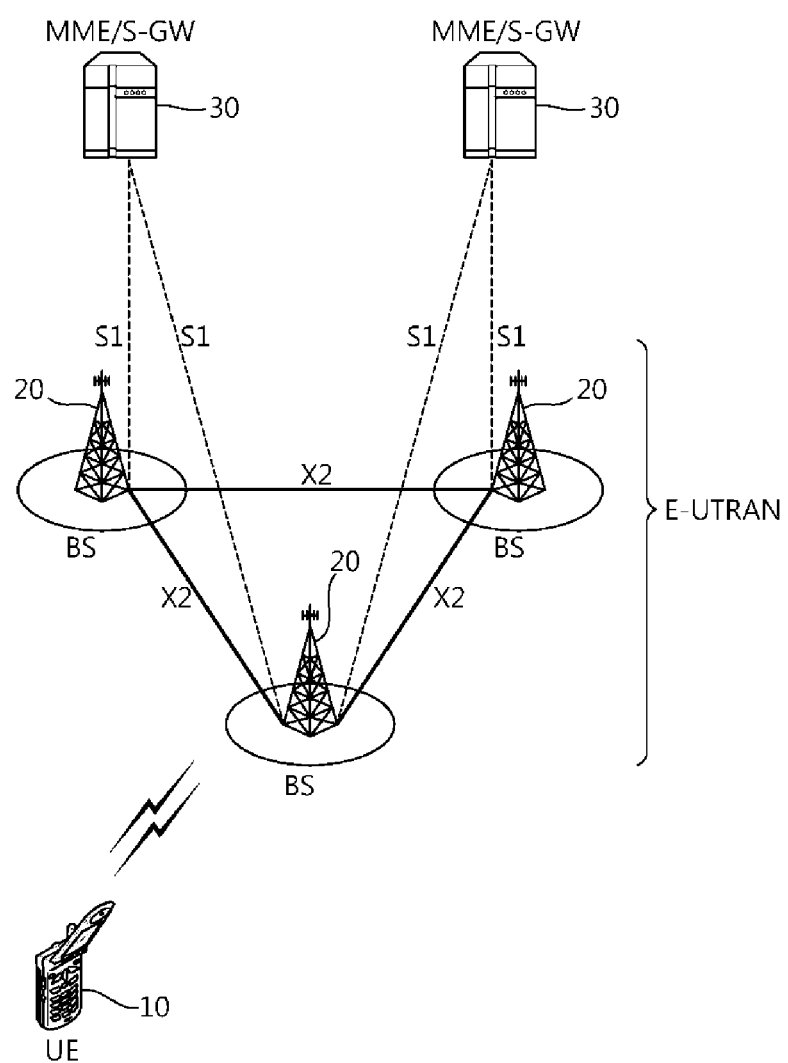
FIG. 1 illustrates a wireless communication system to which the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 Shows a Wireless Communication System to which the Present Invention is Applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
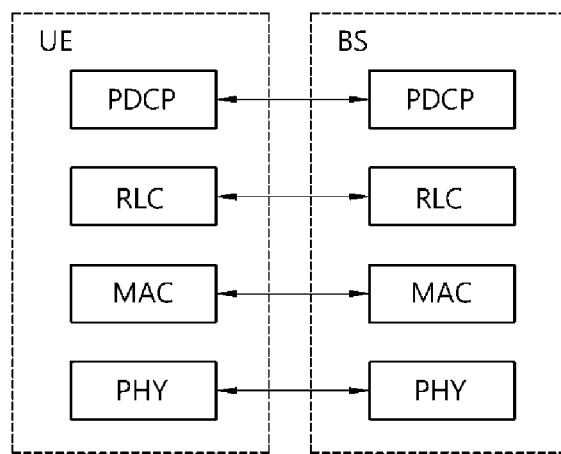
FIG. 2 is a block diagram showing radio protocol architecture of a user plane.
Figure 3:
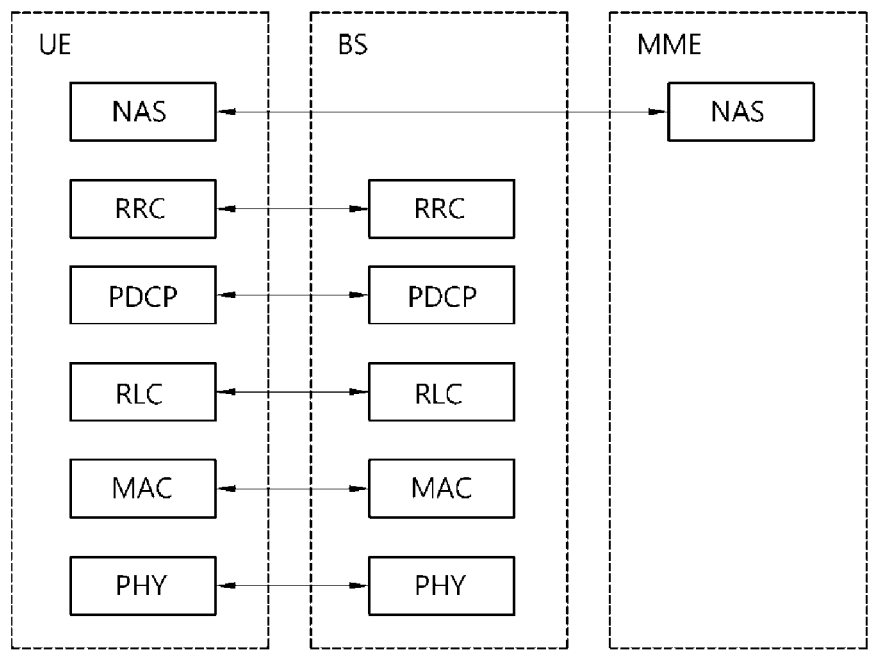
FIG. 3 is a block diagram showing radio protocol architecture of a control plane.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Two states of EPS Mobility Management-REGISTERED (EMM-REGISTERED) and EMM-DEREGISTERED are defined in the NAS layer for the purpose of managing mobility of a UE. The two states are applied to a UE and an MME. In the beginning, the UE is at the EMM-DEREGISTERED state, and the UE carries out a process of registering for a network through an initial attach procedure so that the UE can connect to the corresponding network. Once the attach procedure is carried out successfully, the UE and the MME enter the EMM-REGISTERED state.

To manage signaling connection between a UE and an EPC, two states are defined: EPS Connection Management (ECM)-IDLE state and ECM-CONNECTED state, where the two states are applied to a UE and an MME. If a UE in the ECM-IDLE state establishes an RRC connection to an E-UTRAN, the corresponding UE enters the ECM-CONNECTED state. If an MME in the ECM-IDLE state establishes an S1 connection with the E-UTRAN, the MME enters the ECM-CONNECTED state. While the UE stays in the ECM-IDLE state, the E-UTRAN does not carry context information of the UE. Therefore, the UE in the ECM-IDLE state carries out a UE-based, mobility-related procedure such as cell selection or cell reselection without necessarily having to obey network commands. On the other hand, if the UE stays in the ECM-CONNECTED state, the UE's mobility is managed by the network command. In case the UE's location in the ECM-IDLE state differs from the location understood by the network, the UE informs the network about the corresponding location of the UE through a tracking area update procedure.

In the following, system information will be described.

System information includes essential information for a UE to be connected to a base station. Therefore, a UE has to receive all of the system information before connecting to a base station, and the UE always has to maintain the latest system information. Since the system information is such kind of information that all of the UEs within a cell should be informed of, the base station transmits the system information periodically.

According to Clause 5.2.2 of the 3GPP TS 36.331 V8.7.0 (2009-09) "Radio Resource Control (RRC); Protocol specification (Release 8)", the system information is divided into a master information block (MIB), a scheduling block (SB), and a system information block (SIB). An MIB informs a UE about a physical composition of the corresponding cell, for example, bandwidth. An SB informs the UE about transmission information of SIBs, for example, transmission periods. An SIB is a set of system information related to one another. For example, an SIB may include only the information of neighboring cells while another SIB may contain only the information of uplink radio channels.

In general, services that a network provides to a UE can be grouped into the following three types. Also, depending on which service is provided, the UE perceives the cell type differently. In what follows, service types are described first and cell types are described next.

1) Limited service: this service provides emergency calls and earthquake and tsunami warning system (ETWS), and acceptable cells support this service.

2) Normal service: this service refers to a general-purpose service for public use. Suitable or normal cells can provide this service.

3) Operator service: this service is intended for communication network service providers. This cell is available only for the communication network service providers, but not for ordinary users.

About the service types provided by a cell, cell types can be classified as shown below.

1) Acceptable cell: a cell providing limited services to UEs. In view of the corresponding UE, this cell is not barred, satisfying a cell selection criterion of a UE.

2) Suitable cell: a cell from which a UE can receive a service. This cell satisfies a condition for an acceptable cell and at the same time, satisfies additional conditions. An additional condition requires that a cell in question has to belong to a public land mobile network (PLMN) to which the corresponding UE can be connected, and a procedure of updating a tracking area of the UE should not be prohibited. If the corresponding cell is a CSG cell, a UE should be allowed to access the cell as a CSG member.

3) Barred cell: this cell broadcasts through system information that it is a barred cell.

4) Reserved cell: this cell broadcasts through system information that it is a reserved cell.

In what follows, a procedure for a UE to select a cell will be described in detail.

When a UE is turned on or stays within a cell, the UE carries out procedures for receiving a service by selecting or reselecting a cell of appropriate quality.

A UE in the RRC idle state should always be prepared for receiving a service by selecting a cell of appropriate quality through which to receive the service. For example, a UE just powered up has to select a cell of appropriate quality to register for a network. If the UE which has been in the RRC connection state enters the RRC idle state, the UE needs to select a cell in which the UE can stay while being in the RRC idle state. As described above, cell selection refers to the process where the UE selects a cell which satisfies a particular condition so that the UE can stay in a service-ready state such as the RRC idle state. Since the cell selection is carried out while the UE in the RRC idle state still has not determined a cell to stay in, quickly selecting a cell is far more important. Therefore, as long as a cell provides radio signal quality better than a predetermined reference, it can be selected during the cell selection process conducted by the UE although the cell may not be the one providing the best quality radio signal. Next, the UE can select a cell providing better signal quality through a cell reselection process conducted by the UE. The operation above will be described in more detail with reference to FIG. 4.

Figure 4:
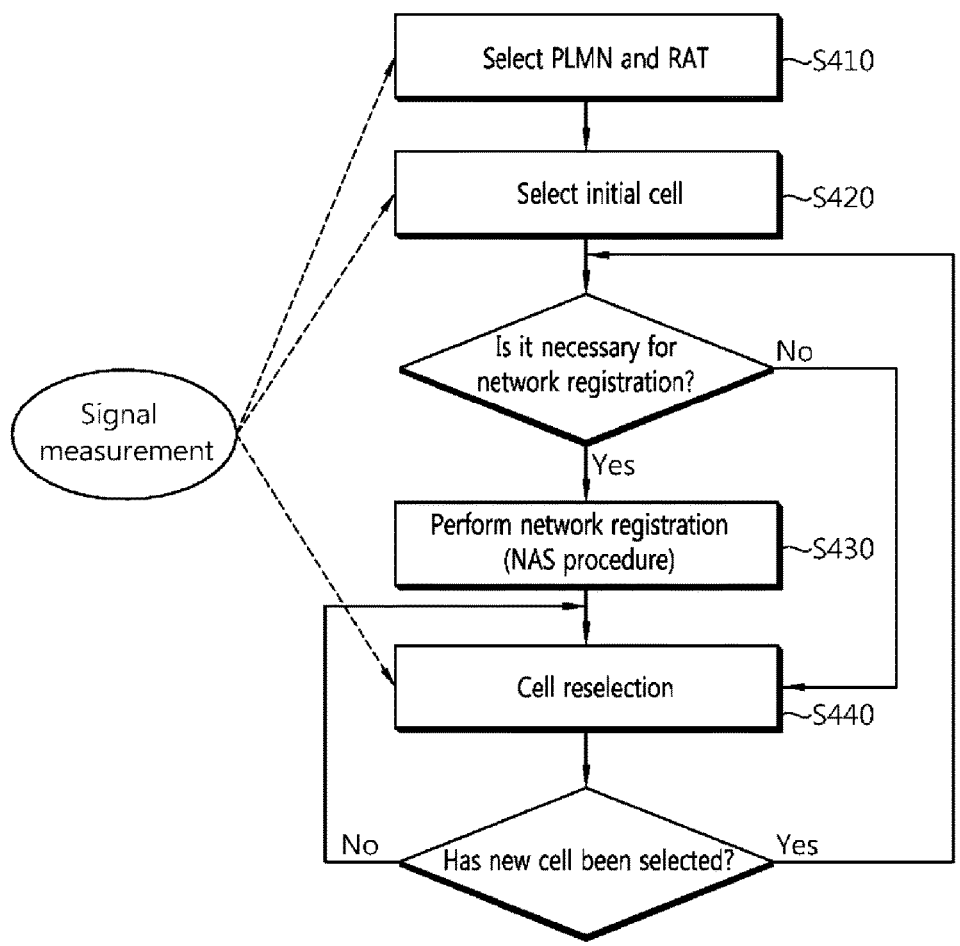
FIG. 4 is a flow diagram illustrating operation of a user equipment (UE) in a radio resource control (RRC) idle state.

FIG. 4 is a Flow Diagram Illustrating Operation of a UE in an RRC Idle State.

As shown in FIG. 4, a UE turned on from the initial power-up registers for a network through the cell selection process and performs cell reselection if needed.

With reference to FIG. 4, a UE selects S410 a radio access technology (RAT) to communicate with the public land mobile network (PLMN) which is the network from which the UE attempts to receive a service. More specifically, the UE searches for available PLMNs when it is turned on from the initial power-up and selects an appropriate PLMN from which the UE can receive a service. A PLMN is such a kind of network which is deployed or run by a mobile network operator. Each mobile network operator operates one or more PLMNs. Each PLMN can be identified by a mobile country code (MCC) and a mobile network code (MNC). The PLMN information of a cell is broadcast being included in the system information. Meanwhile, the user of the UE may provide information about the PLMN and RAT or information stored in information stored in a universal subscriber identity module (USIM) may contain the information about the PLMN and RAT.

Next, among the cells provided by the selected PLMN, the UE selects S420 a cell exhibiting signal quality and characteristics appropriate for the UE to receive a service. In other words, the UE selects the cell showing the strongest signal strength or the best signal quality from among the cells which exhibit signal strength or signal quality of the corresponding base stations stronger or better than a predetermined value. This is a cell selection process carried out by a powered-up UE, which can be called initial cell selection.

After cell selection, the UE receives system information transmitted periodically by a base station. The predetermined value refers to a value defined by the system to ensure quality of a physical signal being transmitted or received. Therefore, according to the RAT employed, the value can be varied.

The UE carries out a network registration process S430 in case network registration is needed S430. The UE registers its own information (for example, IMSI) to receive a service (for example, paging) from the network. The UE doesn't necessarily have to be registered for the network at each time of cell selection, and if the network information obtained from the system information (for example, tracking area identity (TAI)) differs from the network information understood by the UE, the UE registers for the network.

It is often the case that after the UE selects a particular cell through the cell selection process, signal strength or quality between the UE and the base station can be changed due to the UE's mobility or change of radio characteristics of the surrounding environment. Thus, if the quality of a selected cell is degraded, the UE can select a different cell which provides better signal quality. If a cell is selected again as described above, the UE usually reselects a cell which provides better signal quality than a currently selected cell S440. This is called cell reselection. From the viewpoint of radio signal quality, it can be understood that the cell reselection process is intended primarily to enable the UE to select the cell showing the best signal quality.

Besides the viewpoint of radio signal quality, a network may put priorities for the respective frequencies and inform the UE of the set priorities. The UE, receiving the priorities, considers the frequency priorities first before the priorities of radio signal quality during the cell reselection process.

As described above, cells can be selected or reselected according to signal characteristics in a wireless communication environment. In selecting a cell during cell reselection, the following cell reselection methods can be used depending on the RAT and frequency characteristics of individual cells.

Intra-frequency cell reselection: a UE reselects a cell which provides the same RAT and center-frequency as a camping cell.

Inter-frequency cell reselection: a UE reselects a cell which provides the same RAT as but different center-frequency from a camping cell.

Inter-RAT cell reselection: a UE reselects a cell which provides a different RAT from that of a camping cell.

The cell reselection is based on the following principles.

First, a UE measures quality of a serving cell and its neighboring cells to conduct cell reselection.

Second, cell reselection is carried out on the basis of a cell reselection criterion. The cell reselection criterion is determined as follows with respect to a serving cell and its neighboring cells.

Intra-frequency cell reselection is based on ranking. Ranking refers to the task defining indices for evaluating cell reselection and grading cells in the order of magnitude of the indices. The cell of the highest grade is often called the best ranked cell. For most cases, a cell index uses the measurement value that a UE obtains with respect to the corresponding cell and additionally uses a frequency offset or a cell offset depending on the needs.

Inter-frequency cell reselection is based on frequency priorities determined by a network. A UE attempts to camp on the frequency of the highest priority. The network may provide the frequency to be applied commonly to the UEs within a cell or frequency priorities through broadcast signaling. Or the network may provide frequency priorities for the respective UEs through UE-dedicated signaling.

For inter-frequency cell reselection, the network may provide the UE with a parameter (for example, frequency-specific offset) that is used in the cell reselection process for each frequency.

For intra-frequency cell reselection or inter-frequency cell reselection, the network may provide the UE with a neighboring cell list (NCL) that is used in the cell reselection process. The NCL includes a parameter used in the cell reselection process for each cell (for example, cell-specific offset).

For intra-frequency or inter-frequency cell reselection, the network may provide the UE with a blacklist of cell reselection that is used in the cell reselection process. The UE does not carry out the cell reselection process with respect to those cells included in the blacklist.

In what follows, a process of transition from the RRC idle state to the RRC connection state will be described.

Figure 5:
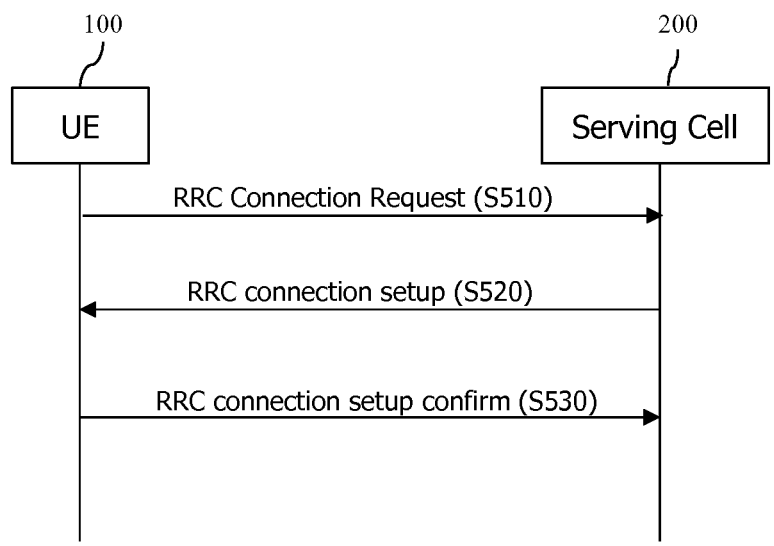
FIG. 5 is a flow diagram illustrating a process of establishing RRC connection.

FIG. 5 is a Flow Diagram Illustrating a Process of Establishing RRC Connection.

A UE sends an RRC connection request message to a network S510. The network sends an RRC connection setup message in response to the RRC connection request S520. After receiving the RRC connection setup message, the UE enters the RRC connection mode.

The UE sends an RRC connection setup complete message to the network, which is used to check whether the RRC connection has been successfully completed S530.

RRC connection reestablishment is carried out similarly to the RRC connection establishment. The RRC connection reestablishment process reestablishes an RRC connection, which is related to restart of SRB1 operation, reactivation of security process, and configuration of a primary cell (PCell). The UE sends an RRC connection reestablishment request message to the network. The network, in response to the RRC connection reestablishment request, sends an RRC connection reestablishment message. The UE, in response to the RRC connection reestablishment message, sends an RRC connection reestablishment complete message.

Now, described will be a radio link failure.

Figure 6:
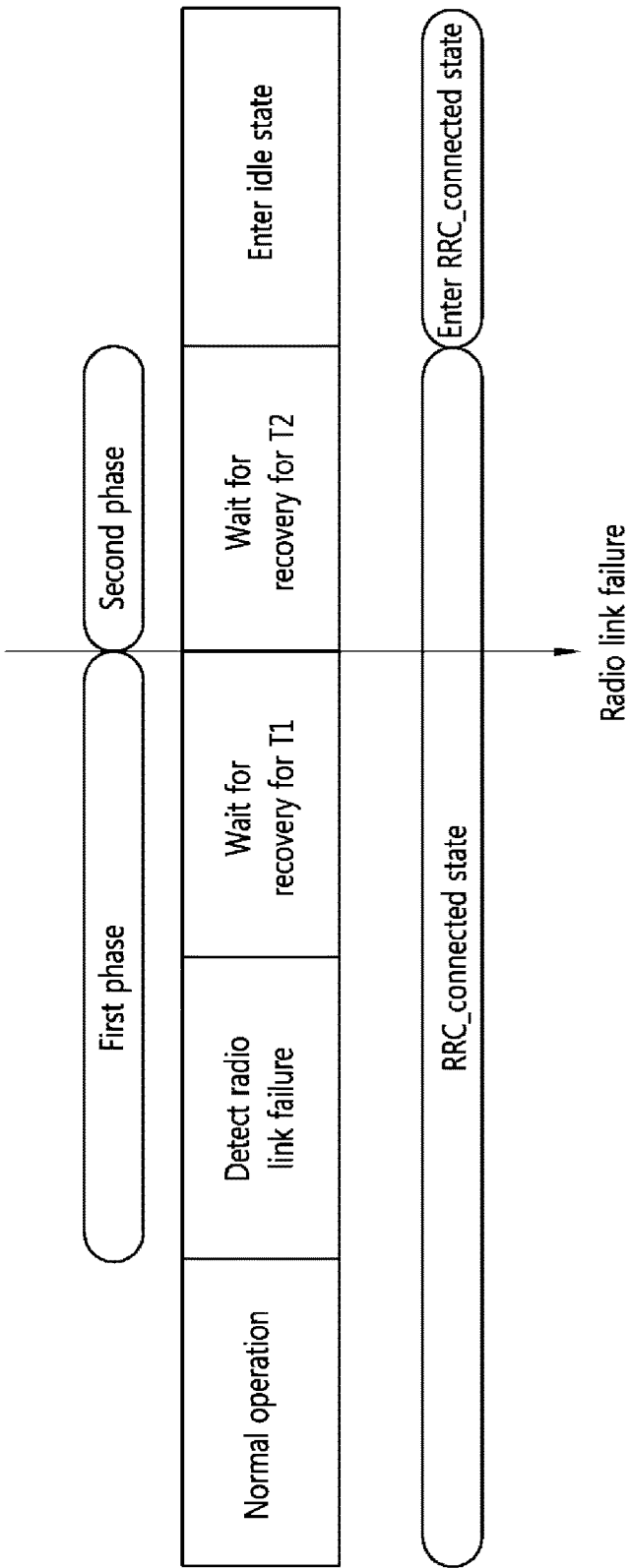
FIG. 6 illustrates a radio link failure.

FIG. 6 Illustrates a Radio Link Failure.

A UE carries out measurement continuously to maintain the quality of a radio link to a serving cell from which the UE receives a service. The UE determines whether communication has been made impossible due to degradation of quality of a radio link to the serving cell. If it is found that the quality of a current serving cell is poor so that communication with the serving cell is not possible, the UE determines that a radio link failure has occurred.

In the case of a radio link failure, the UE abandons maintaining communication with a current serving cell, selects a new one through the cell selection (or cell reselection) process, and attempts to re-establish an RRC connection to the new cell.

More specifically, the operation associated with a radio link failure can be described in two phases.

In the first phase, the UE is under normal operation and checks whether a current communication link has a problem.

The 3GPP LTE specifications describe the cases where normal communication is not possible, as described below.

The case where a UE determines on the basis of measurement of radio quality of its physical layer that there is a serious problem in downlink communication link quality (in other words, the case where the UE determines that the quality of a PCell is low while performing RLM).

The case where a UE determines from successive failures of a random access procedure in the MAC sub-layer that there is a problem in uplink transmission.

The case where a UE determines from successive failures of uplink data transmission in the RLC sub-layer that there is a problem in uplink transmission.

The case where a UE determines that handover has failed.

The case where the message that a UE has received fails to pass an integrity check.

If a UE encounters a problem, the UE declares a radio link problem and waits for the radio link to recover for a first waiting time T1. If the radio link is recovered before the first waiting time is passed, the UE carries out again the normal operation. If the radio link is not recovered until the first waiting time is expired, the UE declares a radio link failure and enters a second phase.

In the second phase, the UE again waits for the radio link to recover for a second waiting time T2. If the radio link is not recovered until the second waiting time is expired, the UE enters the RRC idle state. Or the UE may carry out the RRC connection re-establishment process.

The RRC connection re-establishment refers to the process of re-establishing an RRC connection while being in the RRC connection state. Since the UE does not enter the RRC idle state, the UE does not necessarily initialize all of the connection configurations (for example, radio bearer configuration). Instead, the UE temporarily suspends using the radio bearers except for an SRB at the time of starting the RRC connection re-establishment process. If RRC connection re-establishment is successfully carried out, the UE resumes using the radio bearers which have been suspended temporarily. Detailed descriptions about the above operation will be given with reference to FIG. 7.

Figure 7:
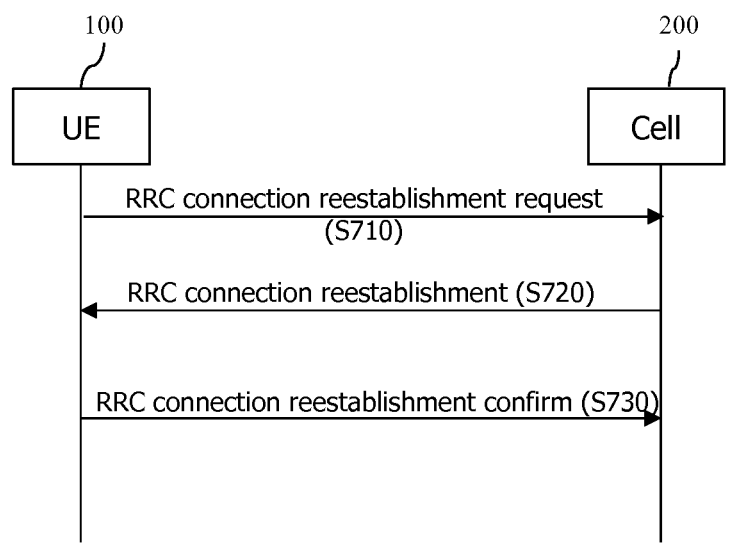
FIG. 7 illustrates an RRC connection re-establishment process.

FIG. 7 illustrates an RRC connection re-establishment process.

To perform the RRC connection re-establishment process, the UE first carries out cell selection to select one cell. From the selected cell, the UE receives system information to get basic parameters needed for connection to the cell.

Next, the UE carries out a random access procedure and transmits an RRC connection re-establishment request S710. Suppose the cell selected by the UE through the cell selection process corresponds to a cell having the context of the UE, namely, a prepared cell. Then the corresponding cell can accept the RRC connection re-establishment request of the UE and therefore, sends an RRC connection re-establishment message S720. Then the UE sends an RRC connection re-establishment complete message to the corresponding cell S730.

Meanwhile, suppose the cell selected by the UE is not a prepared cell. Then since the corresponding cell does not have the context of the UE, it cannot accept the RRC connection re-establishment request of the UE, and therefore, the UE fails to carry out an RRC connection configuration process.

Figure 8:
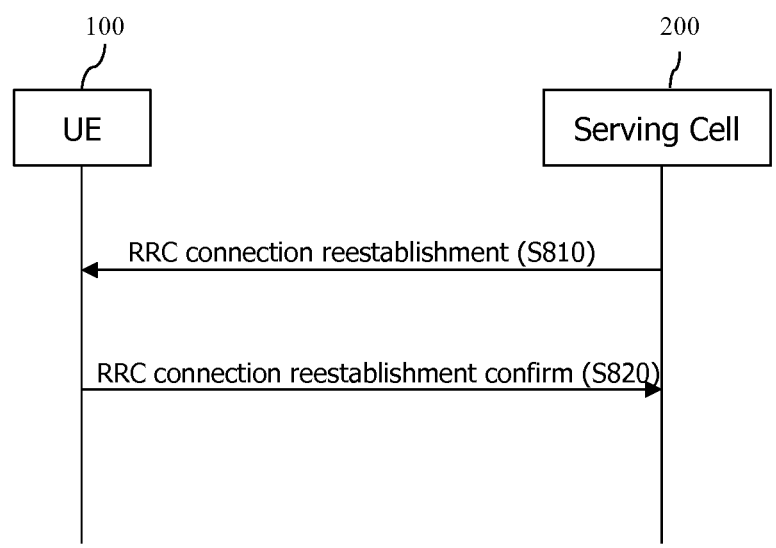
FIG. 8 is a flow diagram illustrating an RRC connection reconfiguration process.

FIG. 8 is a flow diagram illustrating an RRC connection reconfiguration process.

RRC connection reconfiguration is used for modifying an RRC connection. The RRC connection reconfiguration is used for establishment, modification, or release of an RB; carrying out handover; and setting up, modifying, and releasing measurement.

A network sends an RRC connection reconfiguration message to a UE for modifying an RRC connection S810. The UE, in response to the RRC connection reconfiguration message, sends an RRC connection reconfiguration complete message to the network, which is used to check whether RRC connection reconfiguration has been successfully completed S820.

Figure 9:
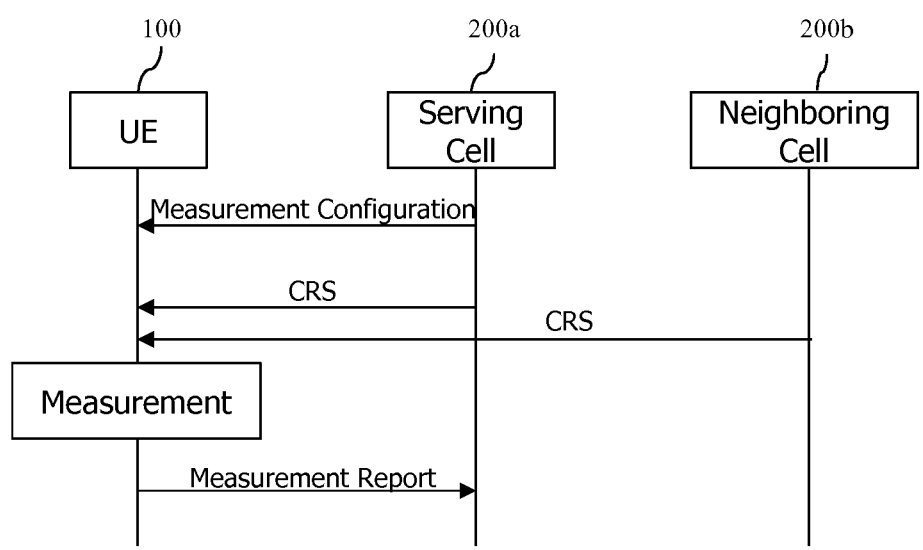
FIG. 9 shows measurement and reporting measurements.

FIG. 9 shows measurement and reporting measurements.

It is an essential feature for a mobile communication system to support mobility of UEs. In this regard, a UE continuously measures quality of a current serving cell and quality of its neighboring cells. The UE reports a measurement result to the network at an appropriate time and the network in turn provides optimal mobility to the UE through handover and the like. The measurement intended for the purpose above is often called radio resource management (RRM) measurement.

As described with reference to FIG. 9, if the serving cell 200a and the neighboring cell 200b send cell-specific reference signals (CRSs) respectively to the UE 100, the UE 100 measures RSRP and RSRQ through the CRS and sends the measurement result to the serving cell 200a.

The UE receives measurement configuration information from the serving cell 100a. A message including the measurement configuration information is called a measurement configuration message. The measurement configuration information may be received through the RRC connection reconfiguration message. The UE carries out measurement on the basis of the measurement configuration information. If the measurement result satisfies a reporting condition within the measurement configuration information, the UE report the measurement result to the base station. A message including the measurement result is called a measurement report message.

The measurement configuration information can include the following information.

(1) Measurement object information: it is the information related to an object against which the UE performs measurement. The measurement object includes at least one of an intra-frequency measurement object which is an object of intra-cell measurement, an inter-frequency measurement object which is an object of inter-cell measurement, and an inter-RAT measurement object which is an object of inter-RAT measurement. For example, the intra-frequency measurement object may correspond to a neighboring cell having the same frequency band as a serving cell, the inter-frequency measurement object may correspond to a neighboring cell having a frequency band different from the serving cell, and the inter-RAT measurement object may correspond to a neighboring cell employing an RAT different from that of the serving cell.

(2) Reporting configuration information: this information describes a reporting condition and a reporting type as to when a UE reports a measurement result. A reporting condition may specify the event or intervals by which reporting of a measurement result is triggered. A reporting type describes in which type the measurement result is composed.

(3) Measurement identity information: this information associates a measurement object with reporting configuration information and determines when and in which type and about which measurement object a UE has to report. The measurement identity information, being included in a measurement reporting message, can describe which measurement object the measurement result is about and under which reporting condition the measurement reporting has been made.

(4) Quantity configuration information: this information is related to a measurement unit, a reporting unit and/or a parameter for configuring filtering of a measurement result.

(5) Measurement gap information: this information is about a measurement gap which is an interval intended only for measurement without taking into account data transmission of a UE to and from a serving cell since downlink or uplink transmission has not been scheduled.

To carry out a measurement process, the UE maintains a measurement object list, a measurement reporting configuration list, and a measurement identity list.

In the 3GPP LTE specification, a base station can allocate only one measurement object to a UE with respect to one frequency band. Clause 5.5.4 of 3GPP TS 36.331 V8.5.0 (2009-03) "Evolved Universal Terrestrial Radio Access (E-UTRA) Radio Resource Control (RRC); Protocol specification (Release 8)" defines the events which cause measurement reporting as shown in the following table.

TABLE 1

| Event | Reporting condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If a measurement result of a UE satisfies an event condition set, the UE sends a measurement reporting message to the base station.

A measurement report may include a measurement identity, measured quality of a serving cell, and a measurement result of a neighboring cell. The measurement identity is used to identify a measurement object for which measurement reporting has been triggered. The measurement result of a neighboring cell may include a cell identity of the neighboring cell and measured quality thereof. The measured quality can include at least one of reference signal received power (RSRP) and reference signal received quality (RSRQ).

On the other hand, the UE can carry out measurement of a particular purpose set by the network and report the measurement result to the network so that a service provider can get information useful for operating the network in addition to the information meant for supporting mobility. For example, suppose the UE receives broadcast information of a particular cell designated by the network. Then the UE can report to the serving cell a cell identity of the particular cell (which is also called a global cell identity), area identification information indicating the area to which the particular cell belongs (for example, tracking area code) and/or miscellaneous cell information (for example, a closed subscriber group (CSG) cell's membership).

In case a UE on the move determines from measurement that radio condition of a particular area is of highly bad quality, the UE can report location information of the cells of inferior quality and a related measurement result to the network. The network can attempt optimization thereof on the basis of measurement reports of UEs supporting network operation.

In the case of a mobile communication system, frequency reuse factor of which is 1, mobility of UEs is usually realized among different cells belonging to the same frequency band. Therefore, in order to ensure a UE's mobility, the UE needs to be able to faithfully measure the quality and cell information of neighboring cells with the same center frequency as that of a serving cell. The measurement of a cell having the same center frequency as that of a serving cell is called intra-frequency measurement. The UE carries out intra-frequency measurement and reports a measurement result to the network at an appropriate time so that the purpose of the corresponding measurement can be realized.

A mobile communication service provider may run a network by using a plurality of frequency bands. In case communication system services are provided through a plurality of frequency bands, it is necessary for a UE to faithfully measure the quality and cell information of neighboring cells having a center frequency different from that of a service cell. In this manner, measurement of a cell having a center frequency different from that of a serving cell is called inter-frequency measurement. It is necessary for a UE to carry out the inter-frequency measurement and report a measurement result to a network at an appropriate time.

In case a UE supports measurement of a heterogeneous network, the UE may carry out measurement of a cell of the heterogeneous network after being configured by a base station. In this manner, measurement of a heterogeneous network is called inter-RAT (Radio Access Technology) measurement. For example, RAT may include a UMTS terrestrial radio access network (UTRAN) and GSM EDGE radio access network (GERAN) compliant with the 3GPP standard. The RAT may also include the CDMA2000 system compliant with the 3GPP2 standard.

Figure 10:
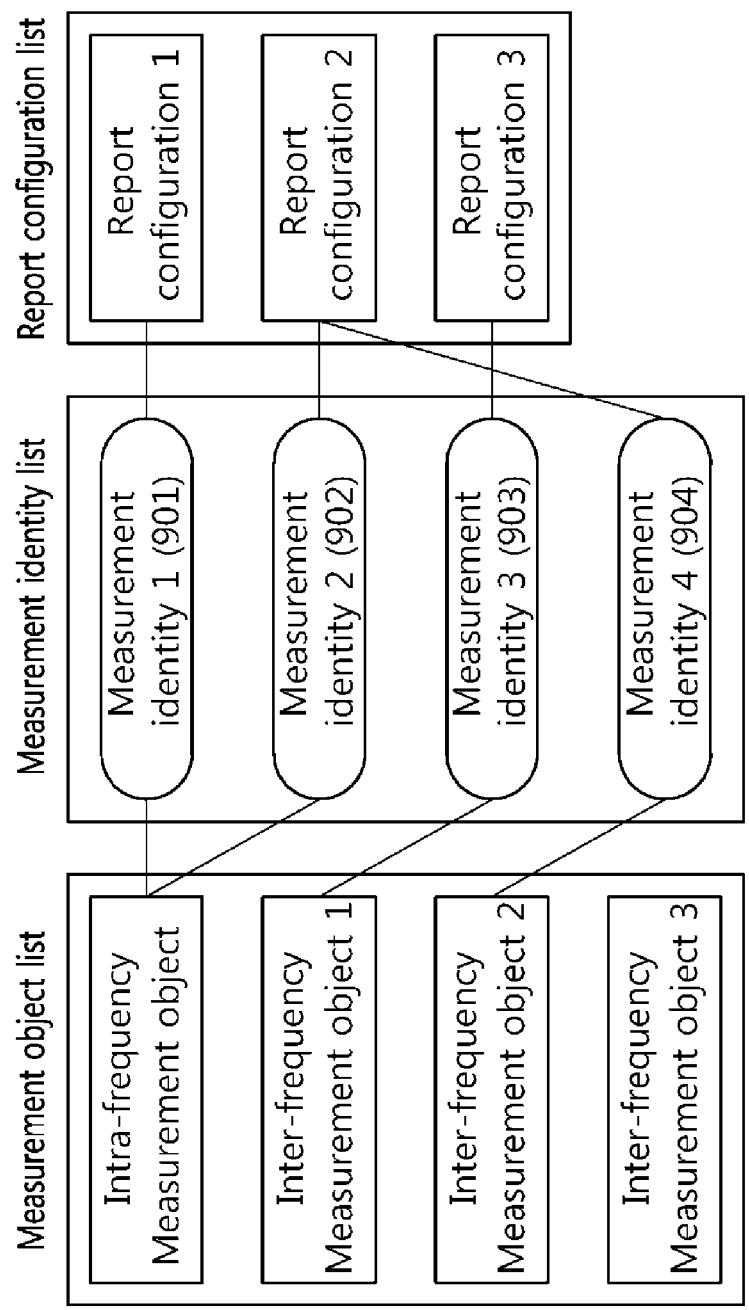
FIG. 10 illustrates one example of measurement configuration applied to a UE.

FIG. 10 illustrates one example of measurement configuration applied to a UE.

First, a measurement identity 1 901 associates an intra-frequency measurement object with a reporting configuration 1. A UE carries out intra-frequency measurement and the reporting configuration 1 is used to determine the criterion and the type of measurement reporting.

A measurement identity 2 902 is associated with an intra-frequency measurement object in the same manner as the measurement identity 1 901, but the intra-frequency measurement object is associated with a reporting configuration 2. The UE carries out measurement and the reporting configuration 2 is used to determine the criterion and the type of measurement reporting.

Due to the measurement identity 1 901 and the measurement identity 2 902, even if a measurement result about an intra-frequency measurement object satisfies either of the reporting configuration 1 and the reporting configuration 2, the UE sends the measurement result.

A measurement identity 3 903 associates an inter-frequency measurement object 1 with a reporting configuration 3. The UE, if a measurement result about the inter-frequency measurement object 1 satisfies a reporting condition specified by the reporting configuration 1, reports the measurement result.

A measurement identity 4 904 associates an inter-frequency measurement object 2 with a reporting configuration 2. The UE, if a measurement result about the inter-frequency measurement object 2 satisfies a reporting condition specified by the reporting configuration 2, reports the measurement result.

Meanwhile, a measurement object, a reporting configuration and/or a measurement identity can be added, modified and/or deleted. The addition, modification, and/or deletion thereof can be commanded as the base station sends a new measurement configuration message or a measurement configuration change message to the UE.

Figure 11:
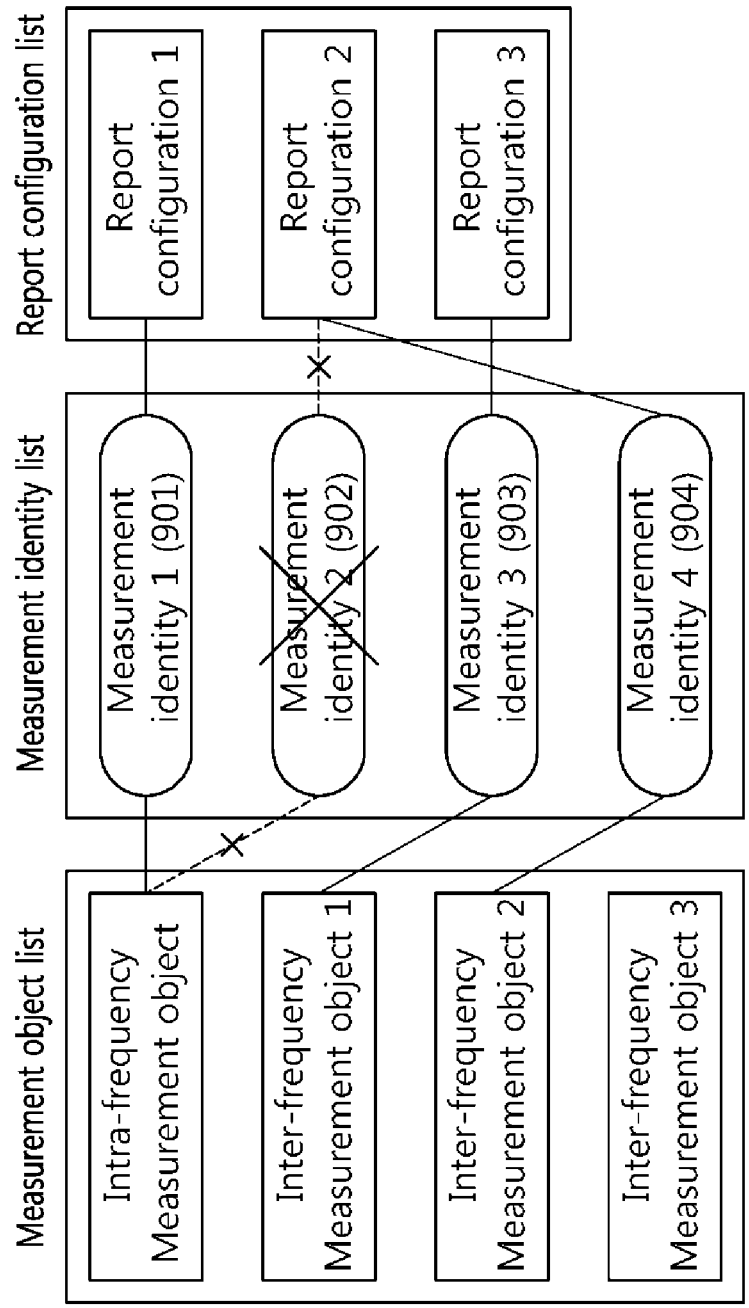
FIG. 11 illustrates an example of removing a measurement identity.

FIG. 11 Illustrates an Example of Removing a Measurement Identity.

If the measurement identity 2 902 is deleted, measurement of an object related to the measurement identity 2 902 is suspended, and a measurement report of the object is not sent. A measurement object or a reporting configuration associated with the deleted measurement identity may not be changed.

Figure 12:
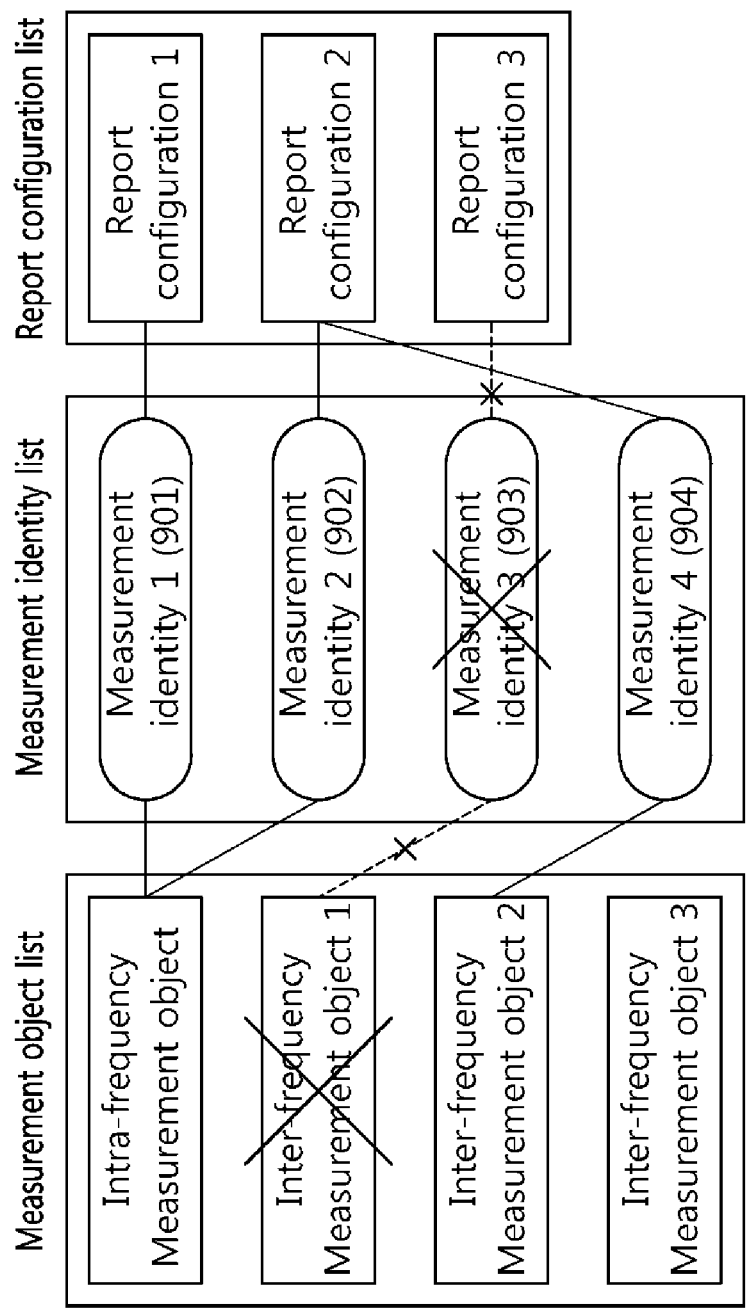
FIG. 12 illustrates an example of deleting a measurement target.

FIG. 12 Illustrates an Example of Deleting a Measurement Target.

If an inter-frequency measurement object 1 is deleted, the UE also deletes an associated measurement identity 3 903. Measurement of the inter-frequency measurement object 1 is suspended, and a measurement report is not sent, either.

However, a reporting configuration associated with the deleted inter-frequency measurement object 1 may not be changed or deleted.

If the reporting configuration is deleted, the UE also deletes its associated measurement identity. The UE suspends measurement of a measurement object associated with the measurement identity. However, the measurement object associated with the deleted reporting configuration may not be changed or deleted.

A measurement report can include a measurement identity, measured quality of a serving cell, and a measurement result of neighboring cells. The measurement identity is used to identify a measurement object for which a measurement report has been triggered. The measurement result of neighboring cells may include cell identities and measured quality thereof. The measured quality can include at least one of reference signal received power (RSRP) and reference signal received quality (RSRQ).

Figure 13:
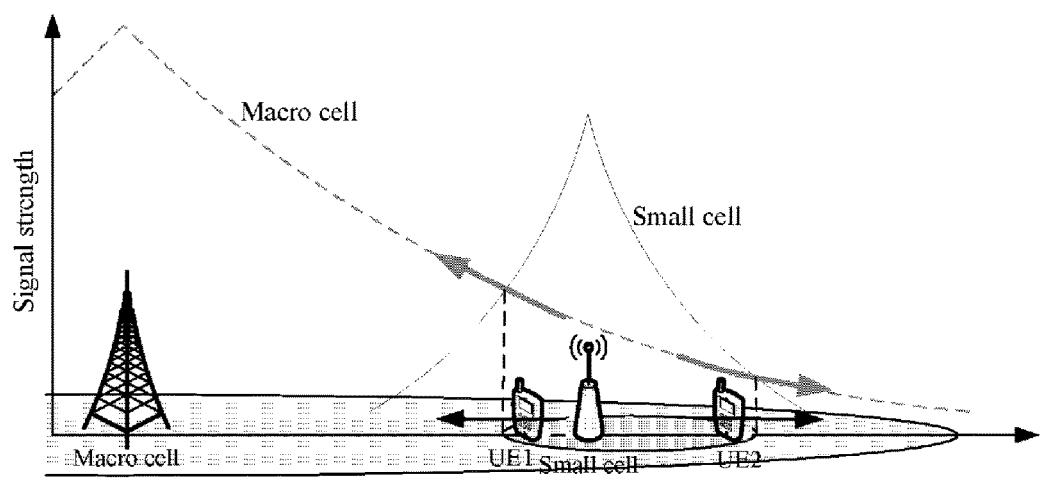
FIG. 13 illustrates a heterogeneous network comprising a small cell and a macro cell.

FIG. 13 Illustrates a Heterogeneous Network Comprising a Small Cell and a Macro Cell.

As the figure shows, the serving cell 200a related to a first 100a and a second UE 100b is a small cell. The small cell corresponding to the serving cell 200a is located within the range of a macro cell (or an umbrella cell) corresponding to a neighboring cell 200b of the small cell. In this case, the first 100a and the second UE 100b receive strong interference from the neighboring macro cell 200b, and magnitude of the interference received from the macro cell changes significantly according to moving directions of the UEs.

In other words, in case the first UE 100a of FIG. 13 moves toward the center of a macro cell corresponding to the neighboring cell 200b, strength of a signal received from the macro cell corresponding to the neighboring cell 200b rapidly increases as the first UE 100a moves. This rapid increase of received signal strength then exerts large interference on the first UE 100a connected to a serving cell 200a, namely, a small cell. Under this circumstance, if handover from the serving cell 200a, namely, the small cell to its neighboring cell 200b, namely, the macro cell is delayed, the first UE 100a fails to receive a handover command message from the serving cell 200a, namely, from the small cell due to strong interference from the neighboring cell 200b, namely, from the macro cell and accordingly experiences a handover failure. Therefore, much faster handover is required for the first UE 100a which moves toward the center of the neighboring cell 200b, namely, the macro cell.

On the other hand, the second UE 100b of FIG. 13 moves toward the periphery of the neighboring cell 200b, namely, the macro cell; according to the movement, a signal from the neighboring cell 200b, namely, the macro cell received by the second UE 100b shows a gradual decrease in its signal strength. If fast handover is applied to the second UE 100b as applied to the first UE 100a moving toward the center of the neighboring cell 200b, namely, the macro cell, the second UE 100b attempts to receive a handover command message before leaving the coverage of the serving cell 200a, namely, the small cell, thereby causing a handover failure.

In this manner, in case the first 100a and the second UE 100b tries to carry out handover from the serving cell, namely, the small cell 200a to its neighboring cell, namely, the macro cell 200b, it will be more effective to start the handover at different timings according to their movement directions.

Therefore, in what follows, described will be a method for adjusting a start timing of measurement reporting for carrying out handover or a start timing of a cell reselection process according to one embodiment of the present invention.

<Method According to One Embodiment of the Present Invention>

To put simply, when handover or cell reselection is required for a UE connected to a small cell, a method according to one embodiment of the present invention determines a start timing of measurement reporting or a cell reselection process by taking into account the movement direction and speed of the UE.

More specifically, according to the method according to one embodiment of the present invention, a UE, being in the RRC connection state or in a camped-on idle state with respect to the serving cell, adjusts a parameter received from the network according to a consecutive measurement result with respect to a particular neighboring cell and uses the adjusted parameter for measurement reporting or the cell reselection process. The measurement result includes an RSRP or RSRQ measurement result about the particular neighboring cell.

The parameter above can include one or more of the parameters shown in the following table.

TABLE 2

| Parameter | Description |
| --- | --- |
| TTT (time to trigger) | TTT parameter specifies the value range used for time to trigger parameter, which concerns the time during which specific criteria for the event needs to be met in order to trigger a measurement report |
| A3-offset | Offset value to be used in measurement report triggering condition for event A3 |
| T-reselection | Cell reselection timer |

The particular neighboring cell is a macro cell which surrounds the coverage of a small cell corresponding to the serving cell of the UE.

Adjustment of the parameter can be carried out as follows.

If a measurement result about a particular neighboring cell for a predetermined measurement time period or for a predetermined number of measurement rises above a threshold, the parameter received from the network, for example, TTT, A3-offset, and T-reselection can be adjusted to a smaller value.

However, if a measurement result about a particular neighboring cell for a predetermined measurement time period or for a predetermined number of measurement drops below a threshold, the parameter received from the network, for example, TTT, A3-offset, and T-reselection can be adjusted to a larger value.

To increase or decrease the parameter value, a scaling factor can be used. For example, if a measurement result about a particular neighboring cell for a predetermined measurement time period or for a predetermined number of measurement has increased above a threshold, the UE may multiply the parameter received from the network by the scaling factor.

Parameter adjustment applies only for the case where a serving cell of the UE is a small cell and its neighboring cell is a macro cell surrounding the coverage of the small cell. If not the situation above, the parameter received from the network can be used as it is.

Meanwhile, whether the neighboring cell is a macro cell surrounding the coverage of the small cell can be figured out by the UE itself or can be informed to the UE through the information received from the serving cell. The information received from the serving cell can include a cell identity list of a particular neighboring cell, measurement time or the number of measurement about the particular neighboring cell, a threshold about RSRP and RSRQ, the parameter value, and a scaling factor about the parameter.

On the other hand, as a modified example, instead of using the scaling factor, a plurality of parameters applied according to the change of consecutive measurement results may be used. In this case, the UE does not rely on the measurement result of a particular neighboring cell to scale the parameter value but selects one appropriate parameter value from the plurality of parameter values and uses the selected parameter value for measurement result reporting or the cell reselection process.

In what follows, the above operation will be described in more detail with reference to FIG. 14.

Figure 14:
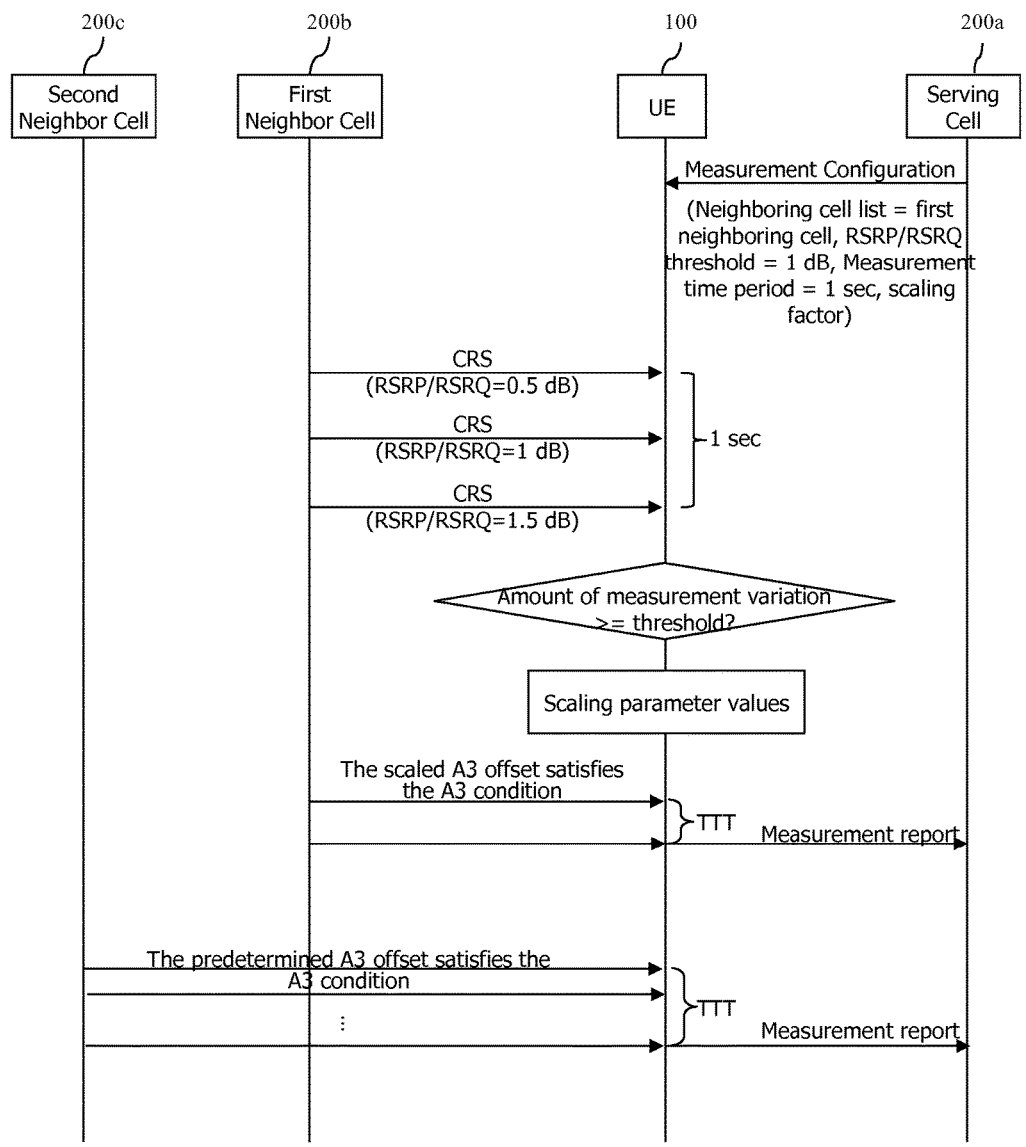
FIG. 14 is a flow diagram illustrating a method according to the present invention.

FIG. 14 is a Flow Diagram Illustrating a Method According to the Present Invention.

Suppose the serving cell 200*a* related to the UE 100 of FIG. 14 is a small cell. It is further assumed that the coverage of the small cell corresponding to the serving cell 200*a* is surrounded by a macro cell corresponding to a first neighboring cell 200*b*.

1) First, the UE 100 receives measurement configuration information from the serving cell 200*a*. The measurement configuration can include a neighboring cell list (in the case of FIG. 14, the identity of a first neighboring cell), a threshold (in the case of FIG. 14, the threshold for RSRP or RSRQ is 1 dB), a measurement period (in the case of FIG. 14, 1 sec), and a parameter (for example, TTT, A3-offset, T-reselection).

At this time, it should be noted that the measurement configuration according to one embodiment of the present invention can further include a scaling factor about the parameter. The scaling factor can include one or more of the scaling factor about TTT, the scaling factor about A3-offset, and the scaling factor about T-reselection. For the sake of description, it is assumed that the scaling factor about TTT is a and the scaling factor about A3-offset is b.

2) Then the UE 100 continuously measures RSRP or RSRQ with respect to a series of CRSs transmitted from the first neighboring cell 200*b* during the measurement time period (in the case of FIG. 14, 1 sec) specified by the measurement configuration.

3) Next, the UE 100 checks the measurement result. To be specific, the UE 100 compares the measurement result with a threshold. More specifically, the UE 100 compares differences among a plurality of measurement performed for the predetermined time period, namely, differences among a plurality of signal qualities with the threshold. At this time, the differences denote the amount of variation.

4) In case the measurement result changes (increases or decreases) far beyond the threshold, the UE 100 scales the parameter value. To be specific, in case the measurement performed during the predetermined measurement period exceeds the threshold, the UE 100 scales down the parameter value. On the other hand, if the measurement performed during the predetermined measurement period fall below the threshold, the UE 100 scales up the parameter value.

Since FIG. 14 assumes that the RSRP/RSRQ increases from 0.5 dB to 1.5 dB, the amount of variation is 1 dB. As a result, since the magnitude of variation 1 dB amounts to the threshold 1 dB as illustrated in FIG. 14, the UE 100 scales down the parameter value. To be specific, the UE 100 scales down the parameter value by multiplying the received parameter value, for example, TTT and A3-offset by the scaling factors a and b, respectively.

Adjusted TTT value=TTT configured by the network*a

Adjusted A3-offset value=A3-offset configured by the network*b

At this time, to perform the scaling down, a and b can be such that 0<a<1 and 0<b<1.

5) Regarding the first neighboring cell 200*b* specified by the neighboring cell list included in the measurement configuration, the UE 100 uses a scaled (adjusted) A3-offset parameter value to determine whether the A3 condition is met. Also, the UE 100 reports a measurement result by using the scaled (adjusted) TTT parameter value.

6) However, regarding the second neighboring cell 200*c* not specified by the neighboring cell list included in the measurement configuration, the UE 100 continues to use the unsealed (unadjusted) A3-offset parameter value to determine whether the A3 condition is met. Also, the UE 100 reports a measurement result by using the unsealed (unadjusted), original TTT parameter value.

Up to this point, a method according to one embodiment of the present invention has been described with reference to FIG. 14.

In the following, summarized will be what has been described so far.

First, the handover failure in a heterogeneous network (HetNet) is described as follows.

1. Handover Failure Situation

To evaluate performance of mobility of a HetNet and determine a handover failure, a radio link failure (RLF) criterion and procedure employ the following definitions.

A handover procedure is divided into three states.

State 1: where a condition for entering A3 is satisfied before an event (handover)

State 2: where the condition for entering A3 is satisfied after the event but before the UE successfully receives a handover command State 3: where the UE receives the handover command but before the UE successfully transmits a handover complete message.

Definitions of RLF modeling and RLF state are as follows.

Definition 1: handover in the state 1 and the state 2. The occurrence of RLF can be classified into two distinctive states. The RLF occurrence in the state 1 and 2 is logged, and a state identity can be assigned to check the influence of parameter setting related to the handover with respect to the RLF and to analyze the handover failure. Optionally, the RLF logged in the state 1 can be further classified into a true RLF event (the event due to departure from radio coverage or radio shadowing) or a handover failure event. The RLF in the state 1 while another cell is available (signal strength (SINR) of the cell is larger than −8 dB) can be regarded as a handover failure.

Definition 2: RLF performance metric for each UE is defined by the average number of RLF occurrence per second. The RLF performance in the state 1 and the state 2 can be logged separately from each other.

It should be noted that a final result is obtained by the average number of RLF occurrence with respect to aggregated movement time of all of the simulated UEs. The final result can be the same as the number of RLFs divided by the total average movement time for each UE. For the purpose of RLF monitoring, a default L1 process in a non-DRX mode can be configured as follows. The L1 sampling rate is once per 10 ms (length of a radio frame).

Handover/PDCCH failure modeling is as follows.

Definition 3: a handover failure can be counted when the RLF occurs in the state 2 or the PDCCH failure is detected in the state 2 or 3.

Calculation of a handover failure with respect to the two states is carried out as follows.

State 2: in case a UE is connected to a source cell and one of the following two conditions is satisfied, a handover failure is calculated. The first condition is related to whether a timer T310 is triggered when HO_CMD is received by the UE (indicating a PDCCH failure). The second condition is related to whether the RLF has occurred in the state 2.

State 3: the handover failure is calculated when the following condition is met after the UE is attached to a target cell. An average wideband CQI which has been filtered for downlink transmission to a target cell at the last moment of handover execution time period in the state 3 is smaller than a threshold Qout (−8 dB).

For the purpose of monitoring a PDCCH failure condition in the state 2, L1 sampling rate is once per 10 ms, and L1 samples are filtered by a linear filter having a sliding window of 200 ms duration (namely, 20 samples). For the purpose of monitoring a PDCCH failure condition in the state 3, L1 sampling rate has to be at least two samples for 40 ms (namely, handover execution time) and is averaged by the number of samples.

Definition 4: handover failure rate is defined as follows. Handover failure rate=the number of handover failures/the total number of handover attempts.

The total number of handover attempts is defined as follows: the total number of handover attempts=the number of handover failures+the number of successful handovers. At this time, the number of handover failures follows the definition 3.

In what follows, problems of handover from a small cell to a macro cell, namely, outbound handover will be described.

As described with reference to FIG. 13, suppose the first UE 100a and the second UE 100b carry out handover to a target cell of the same type, namely, outbound handover to a macro cell. At this time, in case the first UE 100a moves toward the center of the macro cell, the first UE 100a experiences a handover failure in the state 2 as signal strength of the source cell is decreased while signal strength of the target cell is rapidly increased. To improve mobility of the first UE 100, fast execution of a mobility procedure is required. Meanwhile, as the second UE 100b is getting distant from the target cell, signal strength of the target cell is getting a lot smaller, and severe interference from the target cell on the second UE 100b in the state 2 is getting weaker. If a method for improving handover of the first UE 100a is applied the same to the second UE 100b, handover may occur frequently. Therefore, it may not be desirable to apply a means for improving outbound handover blindly to all of the UEs.

In what follows, a means for improving handover from a small cell to a macro cell, namely, outbound handover will be described.

Based on the research on heterogeneous network (HetNet) scenarios, outbound handover from a small cell to a macro cell tends to cause a mobility problem more often than the handover from a macro cell to another macro cell. And most of outbound handover failures occur in the state 2. This is so because due to strong interference from a target cell, namely, a macro cell, signal quality of a source cell, namely, a small cell degrades significantly before the UE receives a handover command message from the source cell, namely, from the small cell.

Therefore, to improve handover performance, a measurement report needs to be made more quickly. By making a measurement report more quickly, the UE can receive a handover command from a source cell before the signal quality of the source cell becomes worse and can enter the state 3. This operating scheme can be realized by adjusting measurement report-related parameters according to the type/magnitude of the source cell and the target cell. If the type of a source cell is a small cell, namely, a pico cell and the type of a target cell is a macro cell, the source call can set the TTT or A3 offset to a small value in order to report a measurement result more quickly.

Now, a method according to one embodiment of the present invention will be summarized below.

In case a small cell which a UE is camped on or connected to is surrounded by coverage of a macro cell, a parameter used for reporting a measurement result or a parameter for cell reselection can be adjusted according to a movement direction of the UE. The following provide a more specific description of the above.

1. Consideration of a Movement Direction of a UE

The UE can use the parameters related to measurement and reporting differently according to its movement direction. The movement directions are divided into the one increasing signal strength of a target macro cell and the other one decreasing the signal strength thereof. The directions may be further divided into finer steps.

The UE can estimate its movement direction by using GPS signals or a measurement result about a particular cell. For example, by comparing consecutive measurement results about a macro cell, the UE can estimate its movement direction. As a more specific example, in case a current measurement result about a macro cell becomes larger than a previous measurement result, it may be assumed that the UE is moving toward the macro cell. In the opposite case, however, it may be assumed that the UE is getting away from the macro cell.

If movement of the UE is directed toward the center of the macro cell, the UE can perform measurement reporting more quickly. To this end, the UE in the RRC connection mode may adjust the parameter to a small value. For example, the UE may scale down the TTT and the A3 offset meant for evaluation of a measurement result. Also, the UE in the RRC idle mode can scale down the T-reselection for evaluation of a measurement result.

On the other hand, if the UE moves away from the macro cell, the UE may adjust the parameter to a large value or use the parameter as it is.

A scaling factor can be included in the measurement configuration and sent from a serving cell to the UE.

2. Use of a Measurement Result of a Target Cell

The UE can use the measurement and reporting-related parameters separately from each other according to the quality of a target cell.

For example, in case measured quality of a target cell, for example, RSRP/RSRQ is larger than a threshold, the UE can perform a measurement reporting process more quickly. In other cases, the UE can perform the measurement reporting process in a normal manner. To this end, the UE in the RRC connection mode can adjust the parameter to a small value. For example, the UE can scale down the TTT and the A3 offset meant for evaluation of a measurement result. Also, the UE in the RRC idle mode can scale down the T-reselection for evaluation of a measurement result.

Performing the measurement reporting more quickly is desirable only when the target cell of measurement is a macro cell and coverage of the macro cell surrounds the small cell to which the UE has connected.

In other words, to determine which parameters to use, the UE can check whether a condition for a particular target cell is satisfied. For the cells other than the target cell, normal parameters can be applied independently of the measurement result. The target cell can be identified by a cell ID informed by the network or by the range of the cell ID. Or the UE can identify the target cell by using such information as PCI, PCI range, and size/type.

Meanwhile, various thresholds can be used in addition to the aforementioned threshold. Also, to subdivide measurement report timing or cell reselection timing, the threshold and the scaling factor can be further divided. In this case, the UE checks the level of subdivision to which the measurement result belongs and a measurement reporting process can be performed quickly at the corresponding level.

Figure 15:
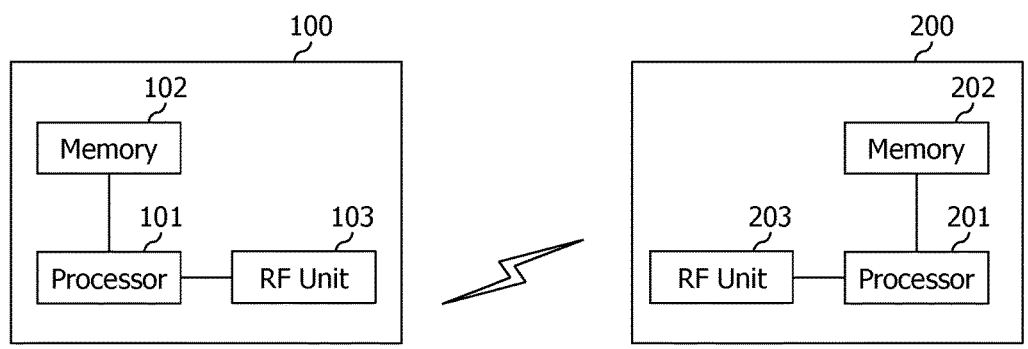
FIG. 15 is a block diagram showing a wireless communication system to implement an embodiment of the present invention.

FIG. 15 is a Block Diagram Showing a Wireless Communication System to Implement an Embodiment of the Present Invention.

The base station 200/300 for macro cell/small cell includes a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

A wireless device such as UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a measurement with respect to a neighboring cell, the method being performed by a wireless terminal and comprising:
   performing measurements on signal qualities with respect to a serving small cell and a neighboring macro cell;
   determining that the serving small cell is surrounded by the neighboring macro cell, based on the result of the measurements;
   determining whether the wireless device is moving toward a center of the neighboring macro cell or the wireless device is moving toward an edge of the neighboring macro cell, thereby leaving a coverage of the neighboring macro cell, based on the result of the measurements,
   wherein, if the serving small cell is surrounded by the neighboring macro cell and if a signal strength from the serving small cell becomes smaller, but a signal strength from the neighboring macro cell becomes greater, it is determined that the wireless device is moving toward the center of the neighboring macro cell, and
   wherein, if the serving small cell is surrounded by the neighboring macro cell and if signal strengths from both the serving small cell and the neighboring macro cell become smaller, it is determined that the wireless device is moving toward the edge of the neighboring macro cell, thereby leaving the coverage of the neighboring macro cell;
   deciding to quickly transmit a measurement report, when it is determined that the serving small cell of the wireless terminal is surrounded by the neighboring macro cell and when it is determined that the wireless device is moving toward the center of the neighboring macro cell;
   scaling down a value of a parameter to trigger a transmission of a measurement report in response to the decision to quickly transmit the measurement report; and
   transmitting the measurement report when the transmission of the measurement report is triggered.

2. The method of claim 1, wherein the parameter includes at least one of:
   a time to trigger the transmission of the measurement report;
   an A3-offset to be used in the measurement report triggering condition for event A3; and
   a cell reselection timer.

3. The method of claim 1, wherein, in scaling down the value of the parameter, the value of the parameter is multiplied with a scaling factor.

4. The method of claim 3, wherein the scaling factor includes at least one of:
   a first scaling factor for the time to trigger the transmission of the measurement report;
   a second scaling factor for an A3-offset to be used in the measurement report triggering condition for event A3; and
   a third scaling factor for a cell reselection timer.

5. The method of claim 3, further comprising receiving at least one of:
   the value of the parameter; and
   information on the scaling factor.

6. The method of claim 1, further comprising:
   deciding to slowly transmit the measurement report or not, when it is determined that the serving small cell of the wireless terminal is surrounded by the neighboring macro cell and when it is determined that the wireless device is moving toward the edge of the neighboring macro cell; and scaling up the value of the parameter to trigger the transmission of the measurement report in response to the decision to slowly transmit the measurement report.

7. A wireless terminal for performing a measurement with respect to at least one of a serving cell and a neighbor cell, the wireless terminal comprising:

a radio frequency (RF) unit; and a processor configured to:

perform, through the RF unit, measurements on signal qualities with respect to a serving small cell and a neighboring macro cell;

determine that the serving small cell is surrounded by the neighboring macro cell, based on the result of the measurements;

determine whether the wireless device is moving toward a center of the neighboring macro cell or the wireless device is moving toward an edge of the neighboring macro cell, thereby leaving a coverage of the neighboring macro cell, based on the result of the measurements, wherein, if the serving small cell is surrounded by the neighboring macro cell and if a signal strength from the serving small cell becomes smaller, but a signal strength from the neighboring macro cell becomes greater, it is determined that the wireless device is moving toward the center of the neighboring macro cell, and wherein, if the serving small cell is surrounded by the neighboring macro cell and if signal strengths from both the serving small cell and the neighboring macro cell become smaller, it is determined that the wireless device is moving toward the edge of the neighboring macro cell, thereby leaving the coverage of the neighboring macro cell;

determine that a serving small cell of the wireless terminal is surrounded by the neighboring macro cell;

decide to quickly transmit a measurement report, when it is determined that the serving small cell of the wireless terminal is surrounded by the neighboring macro cell and when it is determined that the wireless device is moving toward the center of the neighboring macro cell;

scale down a value of a parameter to trigger a transmission of a measurement report in response to the decision to quickly transmit the measurement report; and transmit the measurement report when the transmission of the measurement report is triggered.

8. The wireless terminal of claim 7, wherein the parameter includes at least one of:

a time to trigger the transmission of the measurement report;

an A3-offset to be used in the measurement report triggering condition for event A3; and a cell reselection timer.

9. The wireless terminal of claim 7, wherein, in scaling down the value of the parameter, the value of the parameter is multiplied with a scaling factor.

10. The wireless terminal of claim 9, wherein the scaling factor includes at least one of:

a first scaling factor for the time to trigger the transmission of the measurement report;

a second scaling factor for an A3-offset to be used in the measurement report triggering condition for event A3; and a third scaling factor for a cell reselection timer.

11. The wireless terminal of claim 9, wherein the processor is further configured to receive at least one of:

the value of the parameter; and information on the scaling factor.

12. The wireless terminal of claim 7, wherein the processor is further configured to:

decide to slowly transmit the measurement report or not, when it is determined that the serving small cell of the wireless terminal is surrounded by the neighboring macro cell and when it is determined that the wireless device is moving toward the edge of the neighboring macro cell; and scale up the value of the parameter to trigger the transmission of the measurement report in response to the decision to slowly transmit the measurement report.

* * * * *